March 20, 1928.
M. M. LEAR
RENEWABLE FUSE
Filed March 17, 1926
1,663,343
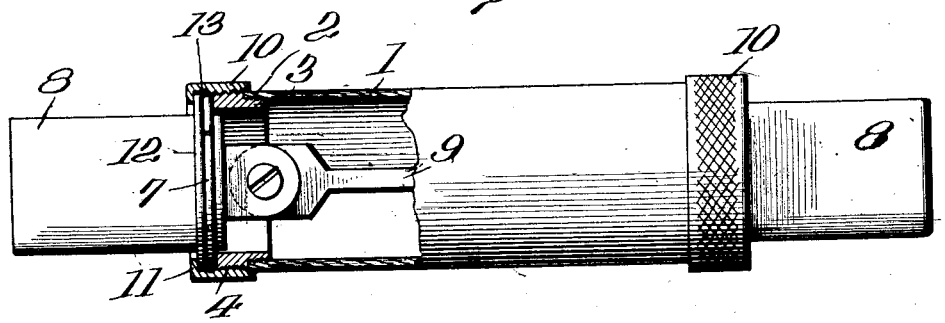
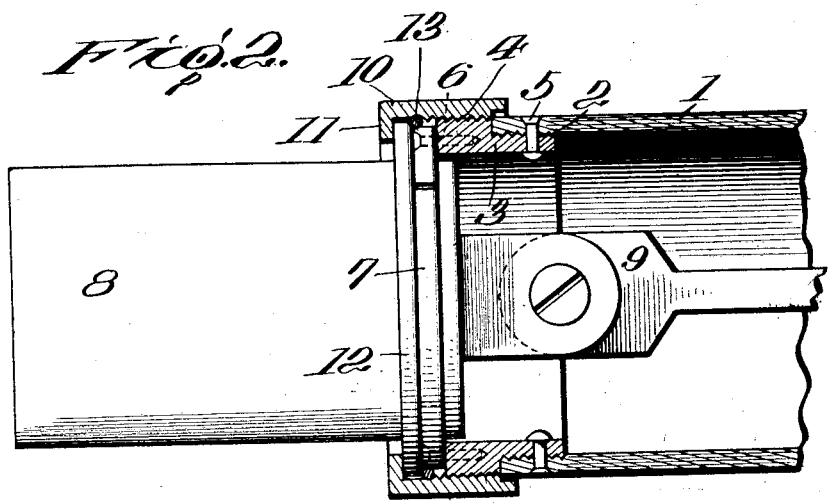
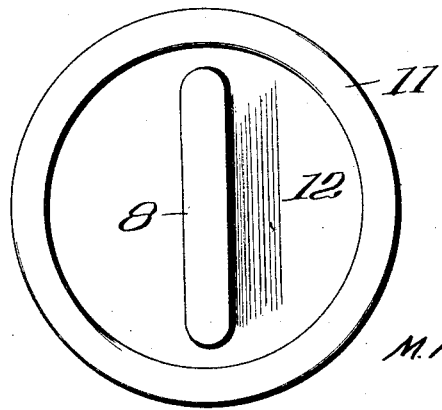
Inventor
M. M. LEAR
By Sturtevant & Mason Attorneys Patented Mar. 20, 1928.

1,663,343

UNITED STATES PATENT OFFICE.

MAX M. LEAR, OF JAMESTOWN, NEW YORK, ASSIGNOR TO MONARCH REFILLABLE FUSE COMPANY, OF JAMESTOWN, NEW YORK, A CORPORATION OF NEW YORK.

RENEWABLE FUSE.

Application filed March 17, 1926. Serial No. 95,338.

This invention relates to renewable fuses, and more particularly to the construction of the end cap and slotted washer which cooperate to position the knife blade and close the end of the fuse cylinder.

The main object of the present invention resides in providing a simple construction for mounting the slotted washer within the ferrule which not only insures a practically gas-tight fit, but also permits the necessary relative rotation therebetween as when the ferrule and washer are screwed upon the fuse cylinder.

Still another object resides in providing a simple attachment for accomplishing the foregoing object, which attachment permits the quick and facile assembly of the fuse.

These and other objects will be apparent from a perusal of the following specification when taken in connection with the accompanying drawings, wherein—

Figure 1 is a view of the complete fuse, certain parts being broken away and shown in section;

Fig. 2 is an enlarged detail view thereof, and

Fig. 3 is an end view of the ferrule.

Referring to the accompanying drawings, the device embraces the usual fiber fuse casing or cylinder 1, preferably interiorly threaded at its ends as at 2 to receive the sleeve 3 which has an outer thickened portion likewise threaded as at 4. If desired, a rivet 5 can be used for permanently uniting the sleeve 3 and casing 1. At diametrically opposite points, the end of sleeve 3 is provided with two pins 6, to which are pivoted bridge pieces 7. These swing across the open end of the cylinder and sleeve and are suitably apertured to fit snugly about the projecting end of the knife blade 8 attached to the fusible link 9 as customary.

Each end of casing 1 is closed by an end cap or ferrule 10 threaded interiorly so that it can be screwed upon the metal sleeve 4. This ferrule 10 is provided with an accurately machined inwardly projecting flange 11 which is adapted to press a metal washer 12 which is slotted so that the knife blade 8 can pass therethrough and be held in proper position relative to the cylinder 1. The flange 11 of the ferrule 10 must tightly and accurately fit the washer 12 to prevent the escape of gases and therefore, the flange 11 is formed best by machining.

The washer 12 is located within the ferrule and must be capable of rotation relatively thereto, that is, the washer with the knife blade passing through its slot must remain stationary when the ferrule 10 is screwed home upon the cylinder 1,—otherwise, the fusible link 9 would be twisted and broken.

It is also highly desirable to mount the slotted washer within the ferrule in such a manner that when the ferrule is removed from the cylinder, the washer will remain in place and will not become lost. The washer is of larger diameter than the inner diameter of flange 11 of the ferrule 10 and is of smaller diameter than the open end of the ferrule so that it can be slipped into place contiguous to flange 11. A split wire ring 13 is then inserted and is sprung into place between the washer 12 and the inner end of the screw thread 4, sufficient space being left to permit the requisite looseness of the washer to permit the relative movement between it and the ferrule as above described.

From the foregoing it is evident that by means of this simple expedient the substantially gas-tight fit and the free turning movement between the ferrule and washer is assured.

It is obvious that minor changes in the details of construction and the arrangement of the parts may be made without departing from the spirit of the invention as set forth in the appended claims.

Having thus described the invention, what I claim as new and desire to secure by Letters Patent, is—

1. A fuse end cap comprising an open-ended ferrule having an inwardly projecting flange on its outer end and a second internal inwardly projecting portion spaced from said flange, a slotted metal washer seated in said ferrule, said washer being of less diameter than the open end of said ferrule and of greater diameter than the inner diameter of said flange, and means adapted to be inserted within said ferrule between the washer and said second portion for retaining said washer in position within said ferrule, said means being constructed and arranged to permit said washer to be rotated relatively to said ferrule.

2. A fuse end cap comprising an open-ended ferrule having an inwardly projecting flange on its outer end and a second internal inwardly projecting portion spaced from said flange, a slotted metal washer of less diameter than the open end of said ferrule and of greater diameter than the inner diameter of said flange, and a split ring adapted to be inserted within said ferrule for holding said washer within said ferrule to cooperate with said second portion contiguous to said flange, said ring permitting the relative rotation of said washer and ferrule.

3. A fuse end cap comprising an open-ended ferrule having a machined inwardly projecting flange on its outer end and an inner thread for screwing onto the fuse cylinder, a slotted metal washer of less diameter than the open end of said thread and of greater diameter than the inner diameter of said flange, and a split spring ring adapted to be located within said ferrule between the washer and the inner end of said thread to retain said washer permanently contiguous to said flange, said spring permitting the relative rotation of said washer and ferrule.

4. In an end construction for cartridge fuses having an insulating tube and a fuse element adapted to be held therein, an open-ended ferrule adapted to be threadedly engaged with the end of the tube, and having an inwardly projecting flange on its outer end, a knife blade terminal and means thereon to clamp the end of said fuse element, bridge pieces pivotally mounted on said tube and adapted to support said terminal, said bridge pieces being of lesser diameter than the open end of the ferrule, a slotted metal washer fitting around said terminal and within said ferrule against said flange, and a split retaining ring mounted in said ferrule to hold said washer in position in said ferrule, said ring being received about said bridge pieces in the assembled condition of said end construction so that said terminal and washer may be rotated relative to said ferrule and so that said ferrule may compress said washer and bridge pieces with regard to said tube to form a sealing relation therewith.

In testimony whereof, I affix my signature.

MAX M. LEAR.